US009101016B2

(12) United States Patent
Han

(10) Patent No.: US 9,101,016 B2
(45) Date of Patent: Aug. 4, 2015

(54) LED ILLUMINATING APPARATUS HAVING ENHANCED QUANTITY OF LIGHT

(71) Applicant: TLI Inc., Seongnam-si, Gyeonggi-do (KR)

(72) Inventor: Jaeduk Han, Seongnam-si (KR)

(73) Assignee: TLI INC., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/347,789

(22) PCT Filed: Jan. 23, 2013

(86) PCT No.: PCT/KR2013/000523
§ 371 (c)(1),
(2) Date: Mar. 27, 2014

(87) PCT Pub. No.: WO2013/111963
PCT Pub. Date: Aug. 1, 2013

(65) Prior Publication Data
US 2015/0084543 A1    Mar. 26, 2015

(30) Foreign Application Priority Data

Jan. 26, 2012   (KR) .................. 10-2012-0007551

(51) Int. Cl.
*H05B 37/02*       (2006.01)
*H05B 33/08*       (2006.01)
(52) U.S. Cl.
CPC .................................. *H05B 33/0815* (2013.01)
(58) Field of Classification Search
USPC .................. 315/224, 307, 291, 308, 185 R
See application file for complete search history.

(56) References Cited

U.S. PATENT DOCUMENTS 8,508,141 B2 *   8/2013   Takeda et al. ................. 315/192
8,698,421 B2 *   4/2014   Ludorf ......................... 315/307

FOREIGN PATENT DOCUMENTS

| JP | 2006-244848 | 9/2006 |
| JP | 2008-059811 | 3/2008 |
| KR | 10-2009-0083782 | 8/2009 |
| KR | 10-2011-0090201 | 8/2011 |
| WO | 2004/100614 | 11/2004 |

OTHER PUBLICATIONS

International Search Report for International Application No. PCT/KR2013/000523 dated May 31, 2013.

* cited by examiner

*Primary Examiner* — David H Vu
(74) *Attorney, Agent, or Firm* — Kile Park Reed & Houtteman PLLC

(57) ABSTRACT

Disclosed is a light emitting diode (LED) illuminating apparatus having enhanced stability of the quantity of light. The LED illuminating apparatus includes an LED lighting block connected to a rectified voltage and including at least one LED module, an alternative reference voltage generating block configured to detect the rectified voltage and generate an alternative reference voltage, and a switching block connected to the tap and configured to form a closed circuit including the at least one LED module. The at least one LED module includes a cathode terminal having a tap. The alternative reference voltage has a voltage level according to a root mean square (RMS) value of the rectified voltage. The amount of currents flowing through the closed circuit is controlled by the alternative reference voltage to have a negative relationship with the RMS value of the rectified voltage. In an LED illuminating apparatus according to the present invention, degradation in uniformity of light due to instability of an input power is reduced.

10 Claims, 5 Drawing Sheets

LED ILLUMINATING APPARATUS HAVING ENHANCED QUANTITY OF LIGHT

TECHNICAL FIELD

The present invention relates to a light emitting diode (LED) illuminating apparatus. More specifically, the present invention relates to an LED illuminating apparatus having enhanced stability of the quantity of light according to variation of an input alternative voltage.

BACKGROUND ART

A light emitting diode (LED) device, which is a kind of a compound semiconductor, is a device that emits light due to an applied voltage. An LED device has a small size, a long life, and high efficiency of conversion of electric energy to light energy. Accordingly, LED illuminating apparatuses using LED devices are gradually replacing incandescent lights and fluorescent lamps.

In an LED illuminating apparatus, it is important to maintain a constant quantity of light regardless of variation in a root mean square (RMS) value of an input voltage in order to maintain a constant light intensity. Here, electric power that determines the quantity of light of an LED illuminating apparatus is proportional to the product of an RMS value (Vrms) of an applied voltage, and an RMS value (Irms) of currents flowing through a closed circuit.

Meanwhile, a resistance component of a closed circuit formed in an existing LED illuminating apparatus is constant regardless of an RMS value of an applied voltage. As a result, when the RMS value of the applied voltage varies, the RMS value of currents flowing through the closed circuit varies, having a positive relationship with the RMS value of the applied voltage.

Accordingly, in the existing LED illuminating apparatus, when the applied voltage is unstable, stability of power of the LED illuminating apparatus is significantly lowered, thereby stability of the quantity of light is lowered, and thereby uniformity of light intensity is lowered.

DISCLOSURE

Technical Problem

An objective of the present invention is to solve the problems of the existing LED illuminating apparatuses, and provide a light emitting diode (LED) illuminating apparatus in which instability of the quantity of light due to instability of an input alternative voltage is reduced.

Technical Solution

According to an aspect of the present invention, there is provided a light emitting diode (LED) illuminating apparatus. The LED illuminating apparatus includes an LED lighting block connected to a rectified voltage and including at least one LED module, an alternative reference voltage generating block configured to detect the rectified voltage and generate an alternative reference voltage, and a switching block connected to the tap and configured to form a closed circuit including the at least one LED module. The at least one LED module includes a cathode terminal having a tap. The alternative reference voltage has a voltage level according to a root mean square (RMS) value of the rectified voltage. The amount of currents flowing through the closed circuit is controlled by the alternative reference voltage to have a negative relationship with the RMS value of the rectified voltage.

Advantageous Effects

In a light emitting diode (LED) illuminating apparatus according to embodiments of the present invention, degradation in uniformity of light due to instability of an input power is reduced.

BRIEF DESCRIPTION OF THE DRAWINGS

A better understanding of the present invention will be had with reference to the attached drawings, and in which.

BEST MODE FOR CARRYING OUT THE INVENTION

Example embodiments of the present invention are disclosed herein. However, specific structural and functional details disclosed herein are merely representative for purposes of describing example embodiments of the present invention, and thus example embodiments of the present invention may be embodied in many alternate forms and should not be construed as limited to example embodiments of the present invention set forth herein. The same reference numbers will be used throughout this specification to refer to the same or like components. In addition, description of well-known functions and constructions may be omitted for clarity and conciseness.

Hereinafter, various embodiments will be described more fully with reference to the accompanying drawings in which some embodiments are shown.

Figure 1:
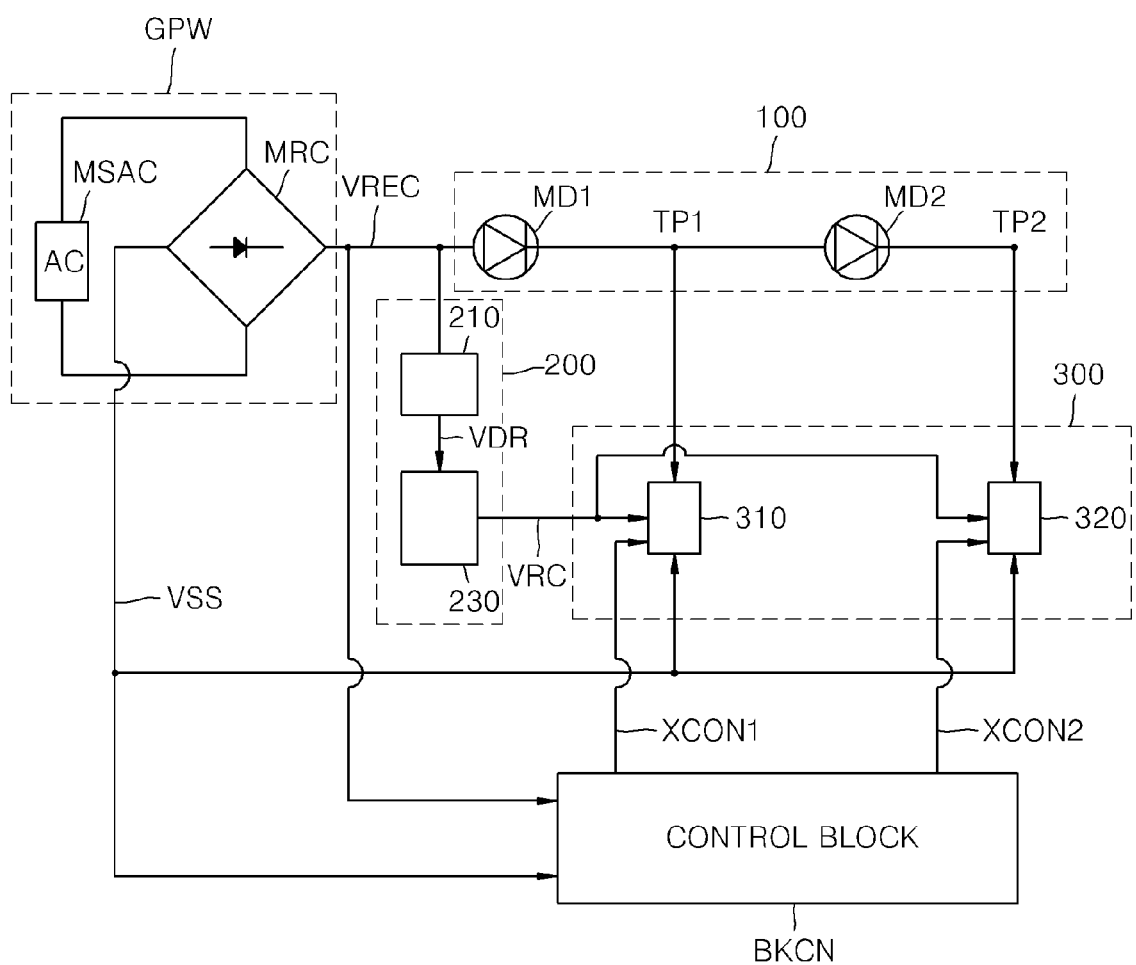
FIG. 1 is a diagram showing a light emitting diode (LED) illuminating apparatus in accordance with an embodiment of the present invention.

FIG. 1 is a diagram showing a light emitting diode (LED) illuminating apparatus in accordance with an embodiment of the present invention. Referring to FIG. 1, the LED illuminating apparatus in accordance with an embodiment of the present invention includes an LED lighting block 100, an alternative reference voltage generating block 200, and a switching block 300.

The LED lighting block 100 is connected to a rectified voltage VREC generated from a rectifier block GPW.

Preferably, the rectifier block GPW includes an alternative current supply MSAC and a rectifier MRC. The alternative current supply MSAC supplies an alternative voltage VAC. Here, the alternative current supply MSAC may be a self generator or an apparatus which receives a voltage from an external source, like household electricity, and supplies the alternative voltage VAC.

The rectifier MRC rectifies the alternative voltage VAC to supply the rectified voltage VREC. Here, the rectified voltage VREC changes with time.

Preferably, the rectifier MRC is a full-wave rectifier which rectifies an entire range of the alternative voltage VAC to a voltage in the same direction to supply the rectified voltage VREC.

That is, a negative (−) voltage of the alternative voltage VAC is rectified to a positive (+) voltage of the rectified voltage VREC.

More preferably, the rectifier MRC is a bridge diode.

Referring further to FIG. 1, the LED lighting block 100 includes a single LED module or a plurality of LED modules. In this embodiment, the LED lighting block 100 exemplarily includes two LED modules MD1 and MD2 connected in series.

Each of the LED modules MD1 and MD2 is formed of at least one LED device and controlled to emit light by the rectified voltage VREC. Here, taps TP1 and TP2 are formed between the LED modules MD1 and MD2, and at a cathode terminal of the last LED module MD2, respectively.

The alternative reference voltage generating block 200 detects the rectified voltage VREC to generate an alternative reference voltage VRC. Here, the alternative reference voltage VRC has a voltage level according to a root mean square (RMS) value of the rectified voltage VREC.

Figure 2:
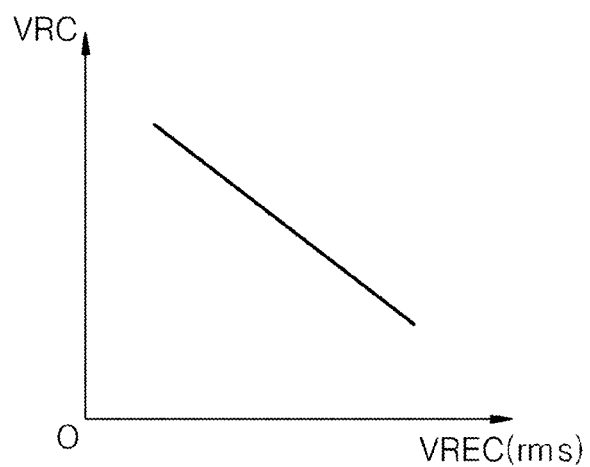
FIG. 2 is a diagram for describing a relationship between a rectified voltage VREC and an alternative reference voltage of FIG. 1.

In this embodiment, the voltage level of the alternative reference voltage VRC has a negative (−) relationship with the RMS value of the rectified voltage VREC, as shown in FIG. 2.

Preferably, the alternative reference voltage generating block 200 includes a driving voltage generator 210 and an alternative reference voltage generator 230.

The driving voltage generator 210 detects the rectified voltage VREC to generate a driving voltage VDR. Here, a level of the driving voltage VDR has a positive (+) relationship with the RMS value of the rectified voltage VREC.

Figure 3:
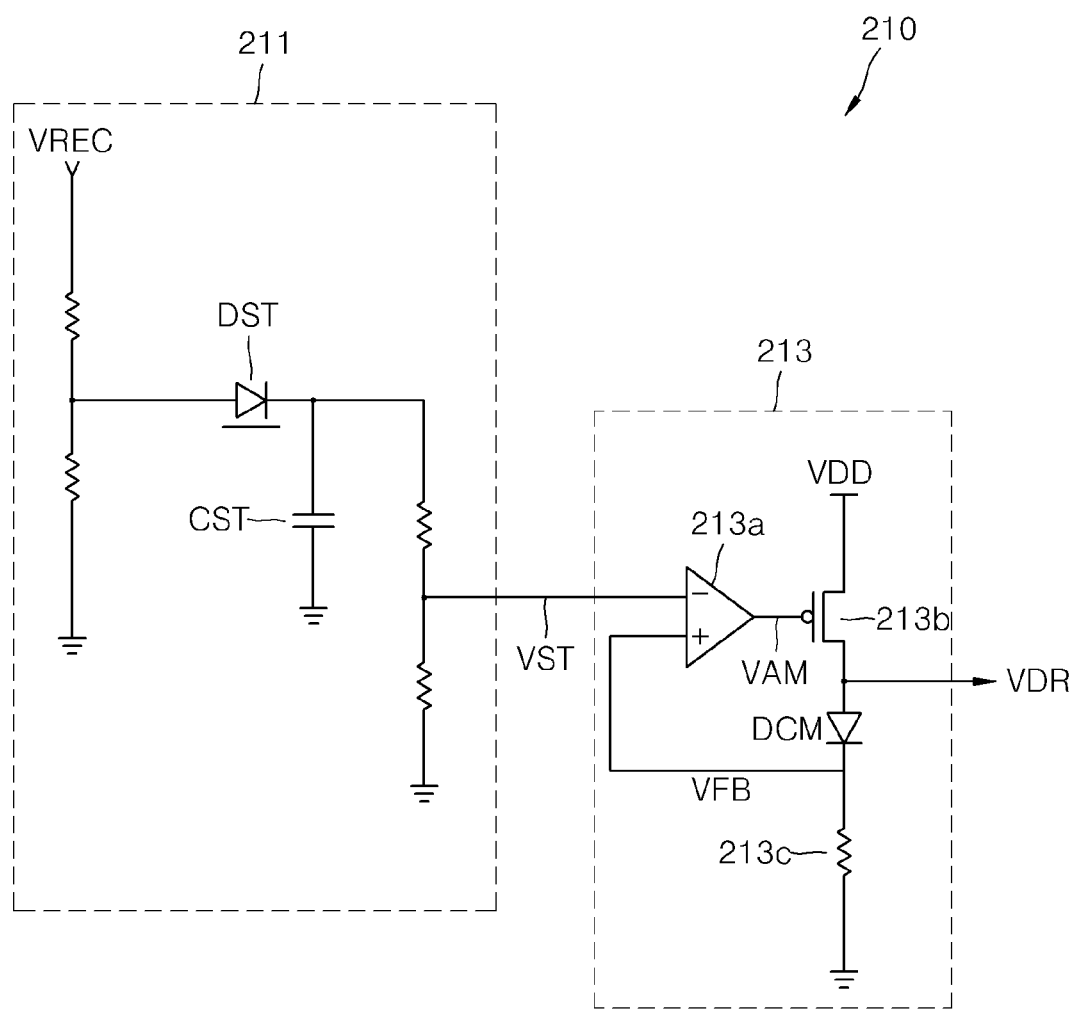
FIG. 3 is a diagram showing a driving voltage generator of FIG. 1 in detail.

FIG. 3 is a diagram showing a driving voltage generator 210 of FIG. 1 in detail. Referring to FIG. 3, the driving voltage generator 210 preferably includes a storage voltage generating unit 211 and a driving voltage generating unit 213.

The storage voltage generating unit 211 includes a storage diode DST and a capacitor CST, and generates a storage voltage VST. The storage diode DST flows currents according to the rectified voltage VREC in one direction as indicated by an arrow (→).

In addition, the capacitor CST stores charges according to the currents flowing through the storage diode DST. In this case, the storage voltage VST may have a level according to the stored charges in the capacitor CST. Accordingly, the storage voltage VST may have a level with a positive (+) relationship with the RMS value of the rectified voltage VREC.

The driving voltage generating unit 213 drives the driving voltage VDR having a voltage level according to the storage voltage VST. Here, the driving voltage VDR may have a level with a positive (+) relationship with the storage voltage VST.

Preferably, the driving voltage generating unit 213 includes a compensating diode DCM operated to compensate a voltage drop occurring in the storage diode DST of the storage voltage generating unit 211.

More preferably, the driving voltage generating unit 213 includes an amplifier 213a, a MOS transistor 213b, the compensating diode DCM, and a resistor 213c.

The amplifier 213a receives the storage voltage VST using an inverting input terminal (−), receives a feedback voltage VFB using a non-inverting input terminal (+), and outputs an amplified voltage VAM.

The MOS transistor 213b is gated by the amplified voltage VAM, has a source terminal connected to a power voltage VDD, and is preferably implemented by a PMOS transistor.

The compensating diode DCM is formed between a drain terminal of the MOS transistor 213b and the feedback voltage VFB, and preferably has the same threshold voltage as the storage diode DST.

In addition, the resistor 213c is formed between the feedback voltage VFB and a ground voltage VSS.

The driving voltage VDR output from the driving voltage generating unit 213 is controlled to be a higher voltage than the storage voltage VST by about a threshold voltage of a diode. That is, a voltage drop occurring in the storage diode DST of the storage voltage generating unit 211 is compensated by the compensating diode DCM.

Referring again to FIG. 1, the alternative reference voltage generator 230 generates the alternative reference voltage VRC according to the driving voltage VDR. Here, the alternative reference voltage VRC has a negative (−) relationship with the driving voltage VDR.

Figure 4:
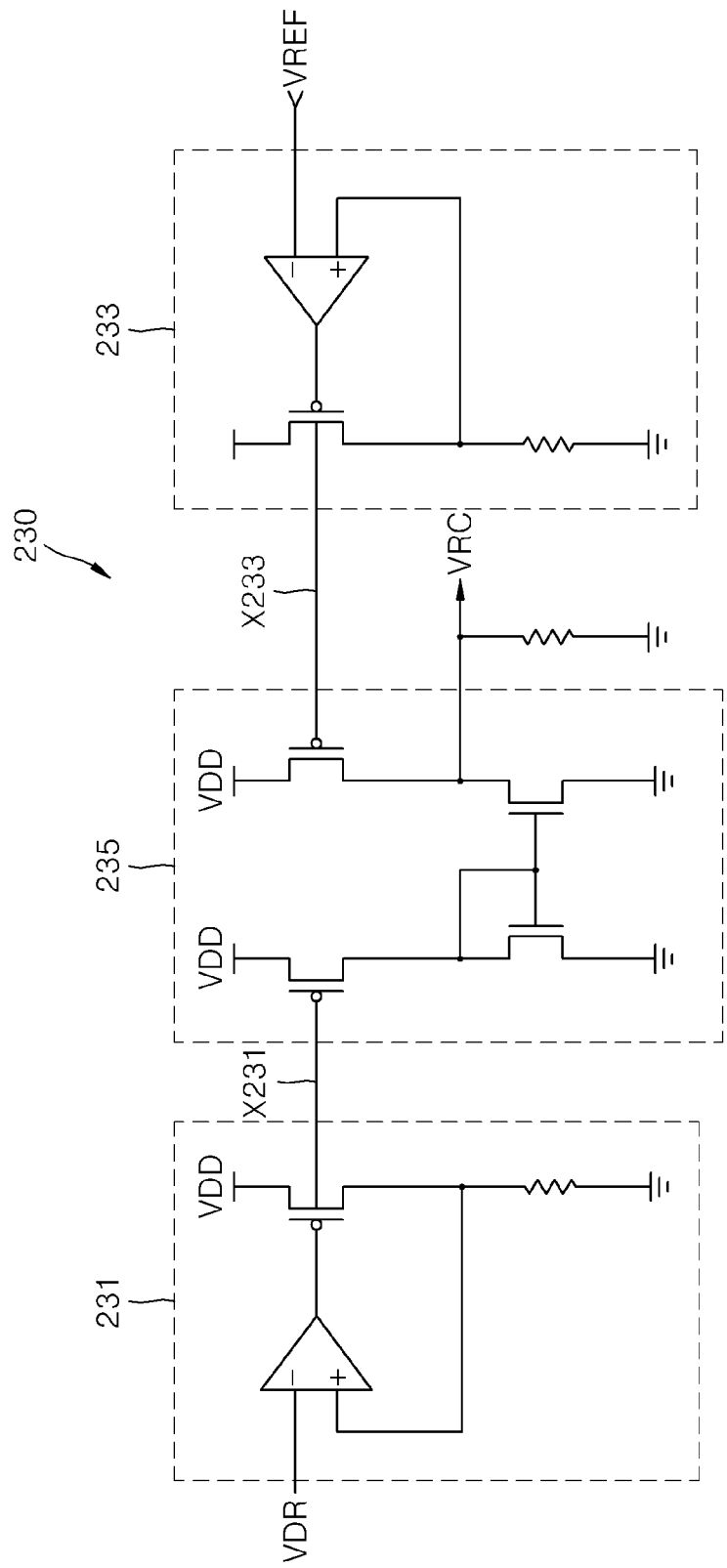
FIG. 4 is a diagram showing an alternative reference voltage generator of FIG. 1 in detail.

FIG. 4 is a diagram showing the alternative reference voltage generator 230 of FIG. 1 in detail. Referring to FIG. 4, the alternative reference voltage generator 230 includes a first amplifying unit 231, a second amplifying unit 232, and a mirroring unit 235.

The first amplifying unit 231 amplifies the driving voltage VDR to be output, and the second amplifying unit 232 amplifies a fixed reference voltage VREF having a constant voltage level regardless of the rectified voltage VREC to be output.

In addition, the mirroring unit 235 mirrors an output signal X231 of the first amplifying unit 231 and an output signal X233 of the second amplifying unit 232 to generate the alternative reference voltage VRC.

According to the alternative reference voltage generator 230, the alternative reference voltage VRC has a negative (−) relationship with the driving voltage VDR, and can be controlled to have a constant voltage level regardless of a process condition.

Referring again to FIG. 1, the switching block 300 is connected to each of the taps TP1 and TP2 of the LED lighting block 100, and operated to configure a closed circuit of the LED modules MD1 and MD2 to the respective taps TP1 and TP2. Here, the amount of currents flowing through the closed circuit is controlled by the alternative reference voltage VRC.

Preferably, the switching block 300 includes first and second switches 310 and 320 which are respectively connected to each of the taps TP1 and TP2 and operated to configure a closed circuit of the LED modules MD1 and MD2 to the taps TP1 and TP2.

In this embodiment, enabling of the first and second switches 310 and 320 is controlled by first and second control signal XCON1 and XCON2 provided from a control block BKCN. Here, the first and second control signal XCON1 and XCON2 maintain a logic state corresponding to a voltage level of the rectified voltage VREC with respect to the ground voltage VSS.

For example, when the rectified voltage VREC is lower than a predetermined boundary voltage, the first control signal XCON1 is activated and the second control signal XCON2 is deactivated. In this case, since the first switch 310 connected to the tap TP1 is enabled, the LED module MD1 is included in the closed circuit, and the LED module MD2 is excluded from the closed circuit.

In addition, when the rectified voltage VREC is higher than the boundary voltage, the first control signal XCON1 is deactivated and the second control signal XCON2 is activated. In this case, since the second switch 320 connected to the tap TP2 is enabled, both of the LED modules MD1 and MD2 are included in the closed circuit.

For reference, in an embodiment in which the LED lighting block 100 includes one LED module MD1, the first switch 310 is implemented to be enabled regardless of a level of the rectified voltage VREC.

In FIG. 1, the first switch 310 and the second switch 320 are different only in the taps connected thereto, and may be implemented in the same form. Therefore, in this embodiment, the first switch 310 is representatively described for brevity.

Figure 5:
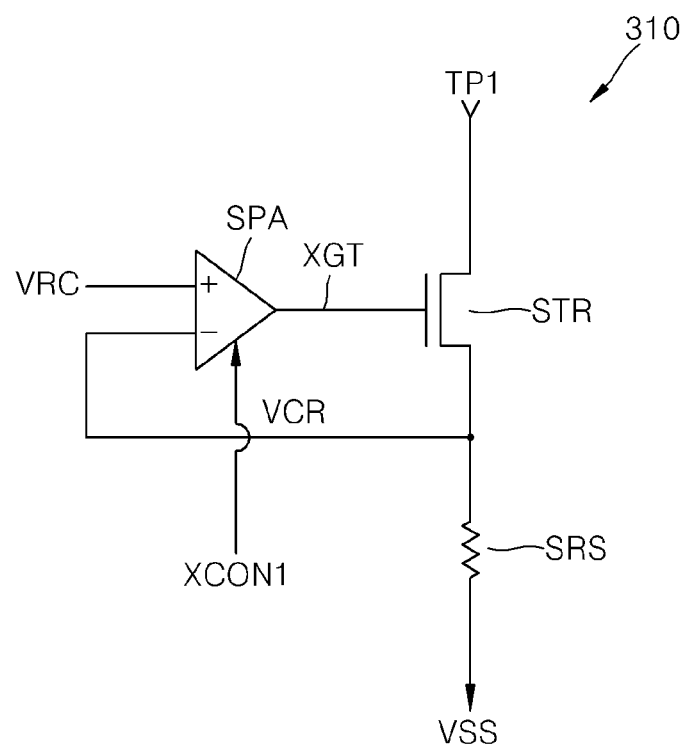
FIG. 5 is a diagram showing the first switch of FIG. 1 in detail.

FIG. 5 is a diagram showing the first switch 310 of FIG. 1 in detail. Referring to FIG. 5, the first switch 310 specifically includes a switching transistor STR, a switching resistor SRS, and a switching comparator SPA.

The switching transistor STR has a junction electrically connected to the tap TP1 corresponding to the switching transistor STR, and is gated in response to a gating signal XGT. Preferably, the switching transistor STR is implemented as an NMOS transistor.

The switching resistor SRS is electrically connected to the other junction of the switching transistor STR, and operated to configure a closed circuit of the LED module MD1 to the tap TP1 corresponding the switching resistor SRS.

In addition, the switching comparator SPA is enabled by the control signal XCON1, and generates the gating signal XGT by comparing a voltage of a loop signal VCR generated from the other junction of the switching transistor STR with the alternative reference voltage VRC.

Preferably, the switching comparator SPA receives the loop signal VCR using an inverting input terminal (−), receives the alternative reference voltage VRC using a non-inverting input terminal (+), and outputs the gating signal XGT.

In this embodiment, the amount of currents flowing through the switching transistor STR, that is, the amount of currents flowing through the LED module MD1 included in the closed circuit formed by the first switch 310, is controlled to have a positive (+) relationship with a level of the alternative reference voltage VRC.

In summary, in the LED illuminating apparatus in accordance with the embodiments of the present invention, the amount of currents flowing through an LED module included in a closed circuit determined according to the rectified voltage VREC is controlled to have a negative (−) relationship with the rectified voltage VREC, that is, an RMS value of the input alternative voltage VAC.

As a result, in the LED illuminating apparatus in accordance with the embodiments of the present invention, instability of the quantity of light due to instability of the rectified voltage VREC, that is, instability of the input alternative voltage VAC, is reduced.

Although a few embodiments have been described, it will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

INDUSTRIAL AVAILABILITY

The embodiments of the present invention can be used in a light emitting diode (LED) illuminating apparatus.

The invention claimed is:

1. A light emitting diode (LED) illuminating apparatus, comprising:
   an LED lighting block connected to a rectified voltage and including at least one LED module, wherein the at least one LED module includes a cathode terminal having a tap;
   an alternative reference voltage generating block configured to detect the rectified voltage and generate an alternative reference voltage, wherein the alternative reference voltage has a voltage level according to a root mean square (RMS) value of the rectified voltage; and
   a switching block connected to the tap and configured to form a closed circuit including the at least one LED module, wherein the amount of currents flowing through the closed circuit is controlled by the alternative reference voltage to have a negative relationship with the RMS value of the rectified voltage.

2. The LED illuminating apparatus of claim 1, wherein the voltage level of the alternative reference voltage has a negative relationship with the RMS value of the rectified voltage, and
   the amount of currents flowing through the closed circuit formed by the switching block has a positive relationship with the alternative reference voltage.

3. The LED illuminating apparatus of claim 1, wherein the alternative reference voltage generating block comprises:
   a driving voltage generator configured to detect the rectified voltage and generate a driving voltage, wherein the driving voltage has a positive relationship with the RMS value of the rectified voltage; and
   an alternative reference voltage generator configured to drive the alternative reference voltage according to the driving voltage, wherein the alternative reference voltage has a negative relationship with the driving voltage.

4. The LED illuminating apparatus of claim 3, wherein the driving voltage generator comprises:
   a storage voltage generating unit including a storage diode and a capacitor and generating a storage voltage, wherein the storage diode flows currents according to the rectified voltage in one direction, the capacitor stores charges according to the currents flowing through the storage diode, and the storage voltage has a level according to the charges stored in the capacitor; and
   a driving voltage generating unit generating the driving voltage having the voltage level according to the storage voltage.

5. The LED illuminating apparatus of claim 4, wherein the driving voltage generating unit comprises a compensation diode operated to compensate a voltage drop occurring in the storage diode of the storage voltage generating unit.

6. The LED illuminating apparatus of claim 5, wherein the driving voltage generating unit comprises:
   an amplifier which receives the storage voltage using an inverting input terminal (−), receives a feedback voltage using a non-inverting input terminal (+), and outputs an amplified voltage;
   a MOS transistor gated by the amplified voltage;
   the compensation diode formed between a drain terminal of the MOS transistor and the feedback voltage; and
   a resistor formed between the feedback voltage and a ground voltage.

7. The LED illuminating apparatus of claim 3, wherein the alternative reference voltage generator comprises:
   a first amplifying unit amplifying the driving voltage to be output;
   a second amplifying unit amplifying a fixed reference voltage to be output; and
   a mirroring unit generating the alternative reference voltage by mirroring an output signal of the first amplifying unit and an output signal of the second amplifying unit.

8. The LED illuminating apparatus of claim 1, wherein the switching block comprises a switch connected to the tap and operated to configure the closed circuit including the at least one LED module to the tap.

9. The LED illuminating apparatus of claim 8, wherein the switch is a switching device formed between the tap and a feedback node, wherein conductance of the switch is controlled according to a voltage of a comparative signal;

a comparator which compares a voltage of the feedback node with the alternative reference voltage to generate the comparative signal; and a resistor device formed between the feedback node and a background voltage of the rectified voltage.

10. The LED illuminating apparatus of claim 9, wherein the comparator receives the feedback signal using the inverting input terminal (−), receives the alternative reference voltage using a non-inverting input terminal (+), and outputs the comparative signal.

* * * * *